(No Model.)
Q. GUILLAUME.
PROCESS OF ORNAMENTING GLASS.
No. 510,597. Patented Dec. 12, 1893.
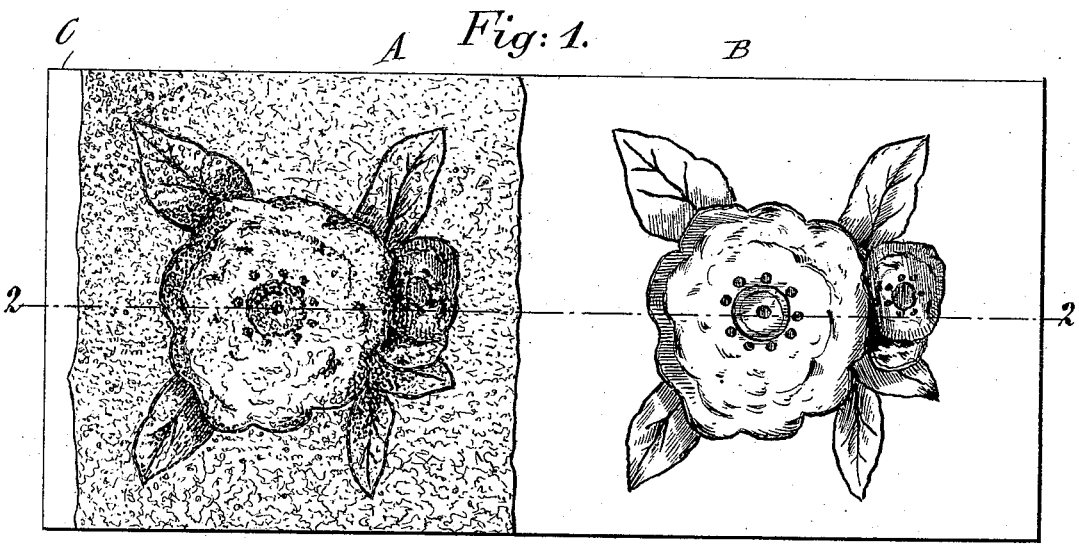
WITNESSES:
Charles Schroeder.
Adolph Scherer.
INVENTOR
Q. Guillaume
BY
ATTORNEYS.

UNITED STATES PATENT OFFICE.

QUIRIN GUILLAUME, OF MOUNT VERNON, NEW YORK.

PROCESS OF ORNAMENTING GLASS.

SPECIFICATION forming part of Letters Patent No. 510,597, dated December 12, 1893.

Application filed July 8, 1893. Serial No. 479,870. (No specimens.)

*To all whom it may concern:*

Be it known that I, QUIRIN GUILLAUME, a citizen of the United States, and a resident of Mount Vernon, in the county of Westchester and State of New York, have invented certain new and useful Improvements in Processes of Ornamenting Glass, of which the following is a specification.

The object of my invention is to provide a new and improved ornamental glass to be used for stained glass windows, signs, doors, transoms, transparencies, &c., and which renders the contour of the glass painting soft and mellow and at the same time gives the entire glass painting great brilliancy and beauty.

In the accompanying drawings, Figure 1 is a face view of a piece of my improved ornamental glass, showing the same in different stages of manufacture, and Fig. 2 is a vertical transverse sectional view of the same.

Similar letters of reference indicate corresponding parts.

The pane of glass to be treated is first cleaned, so that it is perfectly free from grease, dirt, &c. The chosen design, pattern, &c., is then painted on one or both surfaces of the glass and the pane of glass is then placed in a kiln as for ordinary stained glass, or the design can be embossed or cut or ground in or a pattern produced in the ordinary way of manufacturing embossed or cut glass. The pane of glass thus prepared, or if desired a pane of glass without a design, is provided with a thin coat of the following mixture, in the form of powder, or if desired, as a paste, which is spread evenly on the glass, namely: four parts of borax, four parts of white sand, one part of blue oxide of lead and one-fifth part of oxide of tin and one drop of sulphuret of a metal to the square foot of glass, sulphuret of silver being preferred. The glass is then placed in the kiln and fired, whereby this coating which is pasted on, produces on the surface of the glass a granulated coating of glass, which is incorporated with the glass and which covers the painting, ornamentation, &c., that has been previously produced on the glass. This granulated covering gives the glass great brilliancy and increases the beauty of the design to a very great extent. As it is applied over the design, it protects the colors and makes the glass painting much more durable.

In Fig. 1 of the drawings, A shows the completed granulated glass, B shows the glass with a design, and C the plain glass.

In Fig. 2, $a$ represents the pattern or painting on the glass and $b$ the granulated coat.

Having thus described my invention, I claim as new and desire to secure by Letters Patent—

1. The method herein described of ornamenting glass, consisting in producing an ornamentation by paint on the surface of the glass and then providing the glass pane with a granulated surface and burning the same into the glass, substantially as set forth.

2. The method herein described, of ornamenting glass panes, consisting in painting on the glass pane, burning in the paint and providing the glass pane with a coating of material to produce a granulated surface, and burning this coating into the glass pane, substantially as set forth.

In testimony that I claim the foregoing as my invention I have signed my name in presence of two subscribing witnesses.

QUIRIN GUILLAUME.

Witnesses:
OSCAR F. GUNZ,
CHARLES SCHROEDER.